United States Patent [19]

Rich et al.

[11] Patent Number: 5,819,243
[45] Date of Patent: Oct. 6, 1998

[54] SYSTEM WITH COLLABORATIVE INTERFACE AGENT

[75] Inventors: Charles Rich; Candace L. Sidner, both of Newton, Mass.

[73] Assignee: Mitsubishi Electric Information Technology Center America, Inc.

[21] Appl. No.: 743,313

[22] Filed: Nov. 5, 1996

[51] Int. Cl.⁶ .................................................. G06F 15/18
[52] U.S. Cl. ........................................... 706/11; 345/326
[58] Field of Search .................................. 345/326, 336; 395/12, 10; 706/45, 11

[56] References Cited

PUBLICATIONS

C. Rich, "Negotiation in collaborative activity: an implementation experiment," Knowledge–Based Systems, vol. 7(4), pp. 268–270, Dec. 1994.
B.J. Grosz and S. Kraus, "Collaborative Plans for Complex Group Action," Artificial Intelligence, vol. 86(2), pp. 269–357, Oct. 1996.
H.R. Rao, et al., "Intelligent Control and Resolution of a Network of Learning and Problem Solving Processors," Proc. 23rd Annual Hawaii Int'l. Conf. on System Sciences, vol. 4, pp. 316–325, Jan. 1990.
H. Grashoff and L.A. Long, "Cooperative Intelligent Information Systems: Extending Global Schemeta," IEE Colloquium on Distributed Databases, pp. 6/1–3, Dec. 1992.
A. Repenning and W. Citrin, "Agentsheets: Applying Grid–Based Spatial Reasoning to Human–Computer Interaction," Proc. 1993 IEEE Symp. on Visual Languages, pp. 77–82, Aug. 1993.
A.D. Bimbo, et al., "An Interactive Environment for the Visual Programming of Virtual Agents," Proc. IEEE Symp. on Visual Languages, pp. 145–152, Oct. 1994.
C. Rich, "Window Sharing with Collaborative Interface Agents," ACM SIGCHI Bulletin, vol. 28(1), 14 pages, Jan. 1996.
M. Turpeinen, et al., "Architecture for Agent–Mediated Personalised News Services," Proc. First Int'l. Conf. on the Practical Application of Intelligent Agents and Multi–Agent Technology, pp. 615–628, Apr. 1996.
U.M. Borghoff and R. Pareschi, "Constaint–based Information Gathering for a Network Publication System," Proc. First Int'l. Conf. on the Practical Application of Intelligent Agents and Multi–Agent Technology, pp. 45–59, Apr. 1996.
B.J. Grosz, "AAAI–94 Presidential Address: Collaborative Systems," AI Magazine, pp. 67–85, Aug. 1996.

*Primary Examiner*—Robert W. Downs
*Attorney, Agent, or Firm*—Robert K. Tendler

[57] ABSTRACT

The present invention relates to a discourse manager which permits effective collaboration between a user and a computer agent. The system operates according to a theory of collaborative discourse between humans, with the computer agent playing the same role as a human collaborator. The present invention does not concern the internal operation of a particular agent, but relates rather to the structures for managing a collaborative discourse between any type of agent and the user. The discourse manager includes a memory in which application-specific recipes are stored and a memory in which the discourse state is stored. Each recipe specifies a set of actions or subtasks which are performed to achieve an objective. The discourse state includes structures to track the agent's and user's current objectives, a selected recipe for each objective, and completed steps in each recipe. The discourse manager also includes a segmented interaction history, which is a chronological record of all the events in the interaction hierarchically grouped according to their purposes. During operation of the discourse manager, user actions and communications are interpreted according to how they relate to the current discourse state. The manager also generates an agenda of expected communications, which is presented to the user as a menu, obviating the need for the natural language understanding by the agent. Finally, the segmented interaction history permits powerful transformations, such as returning to earlier points in the collaboration and replaying segments in a new context.

12 Claims, 4 Drawing Sheets

SYSTEM WITH COLLABORATIVE INTERFACE AGENT

FIELD OF THE INVENTION

The present invention relates to computer agents. More particularly, it relates to software interface agents which communicate with a user to collaboratively achieve tasks using a shared graphical interface to a software application.

BACKGROUND OF THE INVENTION

Interface agents are software constructs, such as those described in P. Maes, "Agents that Reduce Work and Information Overload", *Communications of the Association for Computing Machinery*, 37(17):30–40 (1994), which assist a user in operating a complex computer application, such as a computer-aided design, information retrieval, or meeting-scheduling system. Typically, the agent is designed to take certain actions at certain times or to suggest certain actions to the user based upon the state of the application. The internal operation of such an agent may consist of an expert system, a neural net, or simply an ad hoc set of instructions, depending on the application. The method in which interface agents currently interact with users is also quite ad hoc and application-specific. There is thus a need for a user-agent discourse system, which can be used with any type of interface agent, and which will permit an agent to truly collaborate with a user in achieving tasks in a shared software application environment.

Collaboration is a process in which two or more participants coordinate their actions toward achieving shared goals. Collaboration, as practiced by human beings, is a very rich phenomenon, which has been studied in detail by many researchers. Most collaboration between humans involves communication. Discourse is a technical term for an extended communication between two or more participants in a shared context, such as a collaboration. A theory of collaborative discourse has been developed by B. J. Grosz, C. L. Sidner, S. Kraus, and K. E. Lochbaum, as described in the following: B. J. Grosz and C. L. Sidner, "Attention, Intentions, and the Structure of Discourse," *Computational Linguistics*, 12(3): 175–204 (1986); B. J. Grosz and S. Kraus, "Collaborative Plans for Complex Group Action," *Artificial Intelligence*, 86 (1996); K. E. Lochbaum, "Using Collaborative Plans to Model the Intentional Structure of Discourse", Ph.D. Thesis, Division of Applied Sciences, Harvard University (1994). Among other things, this theory predicts what kinds of actions and communications are expected at each step in an orderly collaborative discourse. According to the theory, each action or communication in a collaborative discourse must contribute to what is called the SharedPlan for the current objective. A SharedPlan is a common understanding of an objective, the steps to reach that objective, and the ability and intentions of each participant to achieve particular steps. The theory also provides an abstract representation for what are called "recipes." A recipe is a set of actions or subtasks which may be performed in a given order to achieve some objective. Most recipes are specific to the shared application. Examples of communications that might contribute to the current Shared-Plan include identifying which of several possible recipes to use for the objective, identifying an unspecified parameter of the objective or a step in the recipe, and proposing that a particular participant be responsible for achieving a particular step.

A second fundamental concept in the theory is segmentation. Analysis of discourses from a wide range of human collaborations has resulted in the view that collaborative discourse has a natural hierarchical structure. This structure is accounted for by assigning a purpose to each segment, such that each segment's purpose contributes to the Shared-Plan for its parent segment's purpose.

The work of Grosz et al. is concerned primarily with accounting for human behavior. In order to compare the predictions of their theory with human behavior, they have implemented computer simulations in which the current discourse state is represented by a focus stack, which is a stack of segments that keeps track of the agent's and user's current objectives, and a recipe tree, which keeps track of which recipe has been chosen for each objective and which actions or subtasks have been achieved in each recipe. However, Grosz et al. have not applied their theory to software agents. Since existing software interface agents also fail to provide a mechanism for engaging in collaborative discourse with users, a need exists for a mechanism to use discourse theory principles in agent understanding of a discourse.

SUMMARY OF THE INVENTION

The present invention overcomes many of the deficiencies of existing software interface agents by providing a mechanism for true collaboration between the agent and the user. According to one aspect of the invention, a discourse manager exists for interpreting discourse events, namely the user's and agent's actions operating the shared application and the communications between them. The discourse manager includes a library of recipes which specify the steps to be taken to achieve objectives using the application. Upon receipt of a discourse event (communication or observed action), the discourse manager, with reference to the recipe library and the current discourse state, determines how the current event contributes to the current collaboration, and updates the discourse state appropriately.

According to another aspect of the invention, the discourse state in the discourse manager is represented in the form a recipe tree and a segmented interaction history. The recipe tree represents what steps in the recipes for the current objectives are completed and what steps are yet to be done. The segmented interaction history comprises a focus stack and a history list. The focus stack represents which objective or step is the current focus of attention and the higher-level objectives to which the discourse may return after completion of the current focus. As elements are popped off the focus stack, they are added to the history list, so that a complete structured history of the interaction is maintained. The segmented interaction history can be presented to the user in the form of a hierarchically structured chronological log of discourse events, which can be viewed at various levels of detail and in which the high-level purpose of each segment is explicitly identified. The segmented interaction history display serves both to orient the user to where he is in the collaborative problem solving process, as well as to permit powerful transformations on the state of the process.

According to another aspect of the invention, the discourse manager uses the collaborative discourse state to generate an agenda of discourse events that are expected in the current context. The discourse manager can present the appropriate parts of this agenda to the user for selection in the form of a communication menu. Using a communication menu instead of allowing the user to produce arbitrary communications to the agent helps constrain the orderly flow of the collaboration between the user and agent, as well as obviates the need for natural language understanding on the part of the agent.

According to another aspect of the invention, transformations can be applied to the current application state and discourse state based on the segmented interaction history. Examples of history-based transformations include returning to an earlier segment in the history and trying to achieve the objective of that segment using a different recipe, or continuing to work forward starting from the end of an earlier segment which was prematurely stopped.

DETAILED DESCRIPTION

Figure 1A:
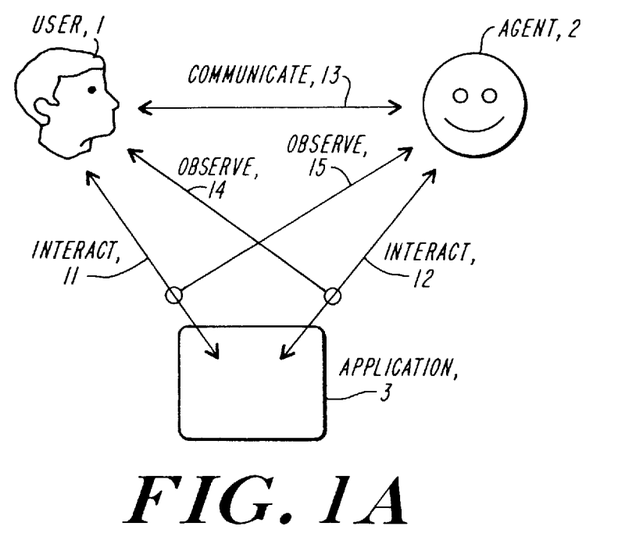
FIG. 1A represents the relationships that characterize an interface agent.

FIG. 1A illustrates the basic relationships that characterize an interface agent. A user 1 operates 11 a computer application 3. An interface agent 2, which is a computer construct designed to assist the user, also operates 12 the application 3. Either the user 1 or the agent 2 may perform any action with respect to the application 3. Furthermore, both the agent and the user can observe 14, 15 the actions of the other.

In order for the user 1 and agent 2 to jointly operate the application successfully, they must work together, i.e., collaborate. As with two people working together on a joint project, the user 1 and the agent 2 must each perform actions 11, 12 which further the joint project and avoid actions which oppose each other. Sometimes working together involves working on the same subtask of the overall project; sometimes it involves working on different subtasks. In order to coordinate this collaboration, the user 1 and the agent 2 need to communicate 13 with each other. The content of this communication 13 consists of proposals, questions, answers, etc., related to the assignment, status, and completion of tasks in the joint project.

The communications 13 between the agent and the user together with their mutual observations 14, 15 of their actions comprise what is called a collaborative discourse. As discussed above, Grosz et al. have developed a computational theory of collaborative discourse based on extensive observation of human collaboration. Among other things, this theory specifies a representation for the current discourse state and the kinds of communication required at each step in the collaboration. The present invention implements their theory in the form of a discourse manager, which permits collaboration between a user and an interface agent.

Figure 1B:
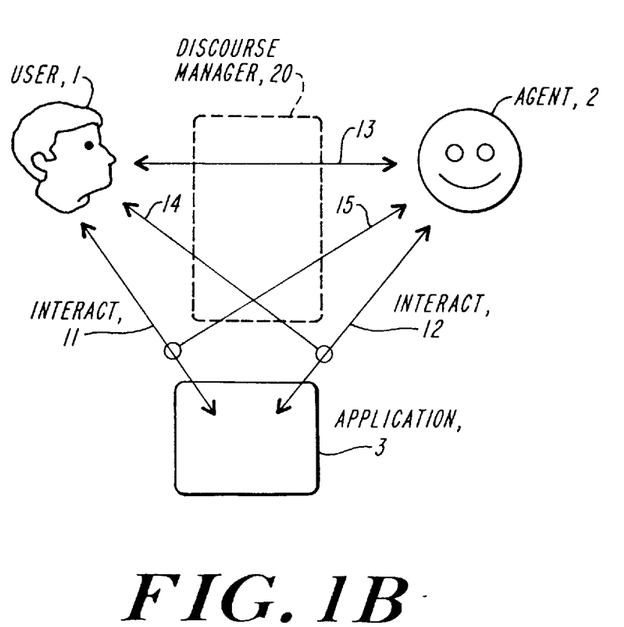
FIG. 1B represents a high-level view of an embodiment of the present invention, which permits collaboration between the user and the interface agent.

FIG. 1B represents a high-level view of an embodiment of the present invention, in which a discourse manager 20 has been added to FIG. 1A to facilitate collaboration between the user 1 and the agent 2. The discourse interface 20 manages all the discourse events in the system, which include communication between the user and agent 13 and mutual observations 14, 15 of their actions. Details of how the discourse manager 20 permits collaboration are described below with respect to FIG. 3.

Figure 2:
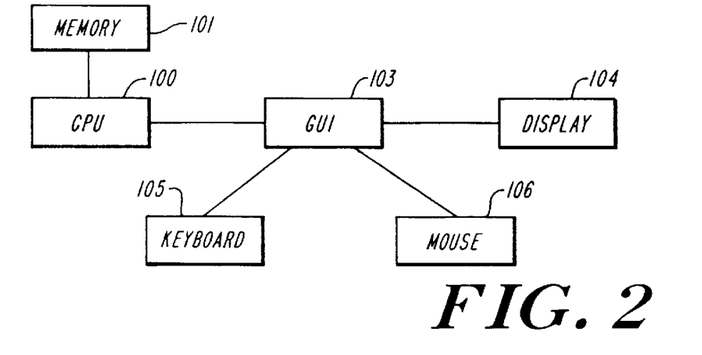
FIG. 2 illustrates hardware for implementing an embodiment of the present invention.

FIG. 2 represents hardware capable of executing the present invention. A central processing unit (CPU) 100 is connected to a memory 101 storing instructions to be executed on the CPU 100. The instructions include instructions for the application executing on the CPU and instructions for operation of the agent. The application and agent would be time multiplexed in operation on the CPU. Alternatively, the application and agent could be operating on separate CPU's with separate memories, which are connected together. Either way, the agent can interact with the application. The data and information for operation of the agent are also stored in the memory.

The CPU 100 is connected to a graphical user interface (GUI) 103 and a display 104. A keyboard 105 and mouse 106 are connected to the GUI 103 to provide for input by the user 1. Of course, the GUI is typically a construct of instructions steps executed on the CPU. However, is it useful to consider the GUI 103 separately. All actions taken by the agent or user occur through the GUI 103. Thus, the user 1 and agent 2 are each able to observe the actions of the other, these actions being part of the collaborative discourse. A GUI structure useful in connection with the present invention is more fully described in a Pat. application Ser. No. 08/414,282, filed Mar. 31, 1995. This application, incorporated herein by reference, is directed to a window sharing structure for use with interface agents.

Figure 3:
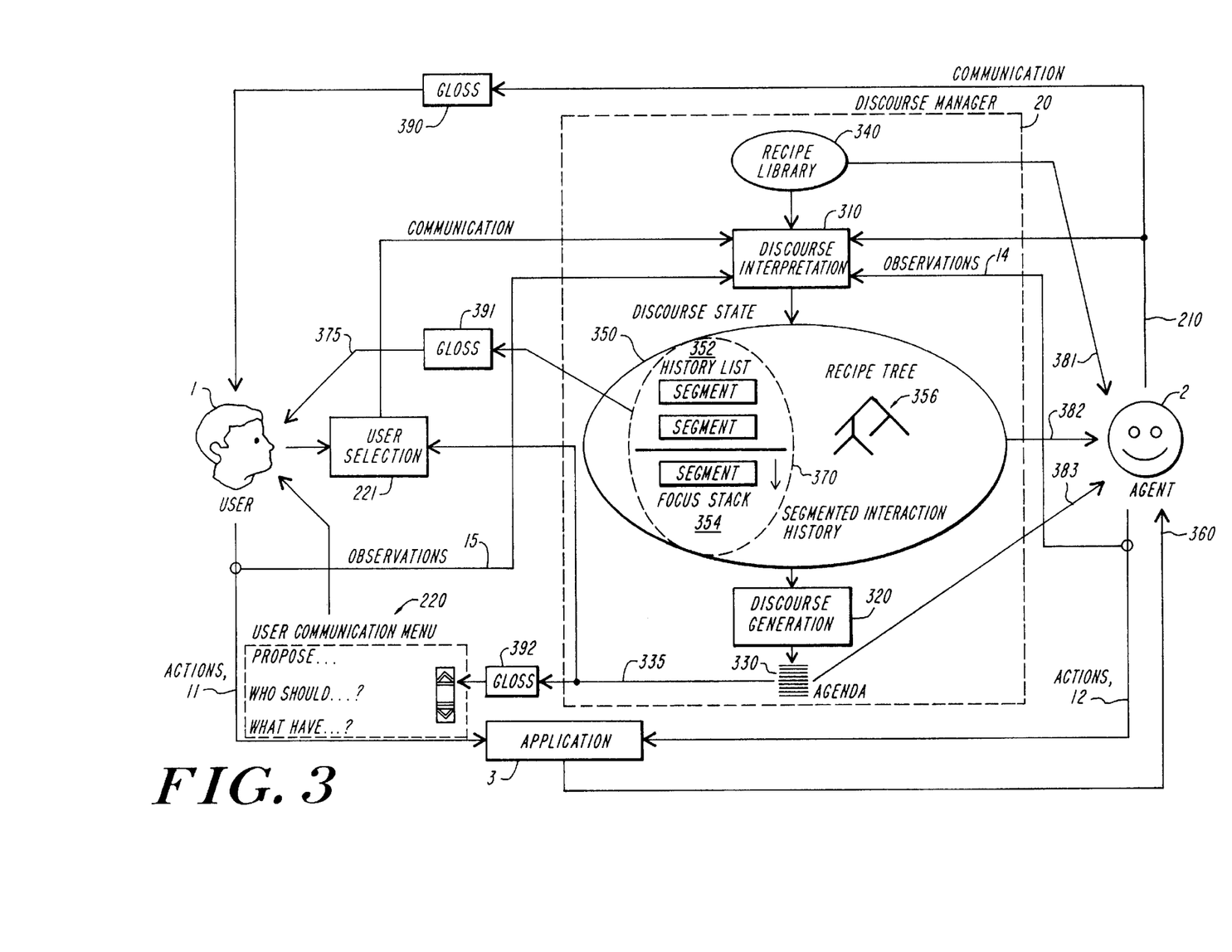
FIG. 3 represents the detailed architecture of an embodiment of the present invention.

FIG. 3 is a block diagram illustrating how collaboration between the user 1 and the agent 2 to operate the shared application 3 is managed via the mechanisms of the discourse manager 20. The system architecture at this level is applicable to any type of agent, because it considers the decision making and action execution of the agent 2 to be a "black box". The agent 2 may contain, for example, a rule-based expert system, a neural net, or simply a set of application-specific instructions. The present invention does not concern the internal operation of a particular agent, but relates rather to the structure of the discourse manager 20 and how it is connected with the user 1 and the agent 2 to form an overall system. The discourse manager 20 provides a generic mechanism for recording and communicating about the decisions and actions made by the agent and the user, but not for the process of actually making decisions or taking actions. However, the discourse manager can provide 381, 382, 383 information about the discourse state and processing to the agent. This information could be used by the agent in the decision making process.

The user 1 receives four types of information from the agent 2 through the collaborative system of the present invention. The first type of information is direct observations 14 of the agent's actions on the application 3 through the GUI 103. The remaining three types of information are presented in natural language, which is a gloss 390–392 of the corresponding internal artificial language representations (described below), generated using simple string template substitutions.

The first type of natural language information presented to the user 1 is direct communications 210 from the agent. The content of such a communication could be a question, an answer, a proposal, a report, etc. The exact method in which such communications are presented to the user may depend on the type of agent and application. One option is to provide overlapping windows in the GUI 103 to accommodate communication from the agent 2 to the user 1; another option is simply to print such communications into a predefined message area. Second, the user is presented with a dynamically changing user communication menu 220, which is computed from the current discourse agenda 330

(described below). Third, the user can request a display 375 of the segmented interaction history 370 (described below), either to orient himself or as preparation for applying a history-based transformation (described below).

The user 1 provides two types of information to the agent 2 through the collaborative system of the present invention. First, when the user performs actions 11 on the application 3 through the GUI 103, observations 15 of these actions become inputs to the discourse interpretation module 310 of the discourse manager 20. Second, the user 1 selects 221 from the choices presented in the current user communications menu 220.

Although the agent 2 is ultimately a black box containing application-specific code, the collaboration system of the present invention does provide three types of information, which can be useful inputs when developing an agent for a particular application. The first input 381 to the agent 2 is the recipe library 340 (described below), which contains knowledge about how to decompose application-specific objectives into subtasks. This kind of information is obviously useful for deciding how to achieve objectives. The second input 382 to the agent 2 is the current discourse state 350 (described below). A truly collaborative agent needs to base its decisions and actions not only on the current application state, but also on the current state of the collaboration. Through the use of a callback mechanism, the agent 2 can arrange to inspect the new discourse state whenever the user 1 performs an action 11 or selects a communication 221. The third input 383 to the agent 2 is the discourse agenda 330 (described below). This agenda often includes candidate actions or communications which the agent may decide to perform. In addition to these three inputs from the discourse manager 20, the agent 2 may also receive information 360 about the state of the application 3 through the application's programming interface.

The agent 2 also produces two types of output. First, the agent 2 produces communications 210 which are received in internal form by the discourse interpretation module 310 and are glossed into natural language 390 to be presented to the user 1. Second, the agent 2 performs actions 12 on the application through the GUI 103, which are observed by the user 14 and are also input to the discourse interpretation module 310.

The discourse manager 20 includes five principal elements related to managing collaborative discourse: a discourse interpretation module 310, a discourse state structure 350, a discourse generation module 320, a discourse agenda structure 330, and a recipe library structure 340.

The recipe library 340, which is stored in the memory 101, contains a set of schemata, or recipes, which embody knowledge about how to decompose goals into subgoals. Although there exist very general, application-independent recipes, such as divide and conquer, the present invention relates primarily to recipes about how to achieve specific objectives using the application program 3.

At its most abstract, a recipe is a resource used to derive a sequence of steps to achieve a given goal (the objective of the recipe). More concretely, a recipe is typically represented as a partially ordered sequence of actions (steps) with constraints between them. The recipe library contains recipes indexed by their objectives. There may be more than one recipe for each type of objective. Recipes with a fixed number of steps are easily represented in such a simple recipe formalism. More complicated recipes, wherein the number and order of the steps depend on parameters of the objective, can be represented by procedures, called recipe generators, which, given an objective, return a recipe. A procedure can also be associated with a recipe to test whether it is applicable at a given point in time. Finally, another application-specific procedure, called a recipe recognizer, can be associated with a recipe in order to facilitate discourse interpretation 310 (described below) by, for example, grouping a sequence of similar actions on the same object into a single abstract action.

Building a recipe library for a particular application is very similar to what is called "data modeling" in database management or "domain modeling" in artificial intelligence. It also overlaps with modern specification practices in software engineering, although the actions and recipes in a recipe library for collaborative discourse include more abstract concepts than are usually formalized in current software practice, except for in expert or knowledge-based systems. It is also important to note that, since the agent is not restricted to using only the recipe library for its decision making and execution, the recipe library itself only needs to be complete enough to support communication and collaboration with the user.

The discourse interpretation module 310 receives discourse events, namely selections 221 from the user communication menu 220, copies of communications 210 from the agent to the user, and observations 14, 15 of the agent's and user's actions. All of these inputs are in the internal artificial language (described below). The main job of the discourse interpretation module 310 is to explain, with reference to the recipe library 340 and the current discourse state 350, why a given action or communication makes sense at the moment, and then to update the discourse state 350 appropriately. In human collaborative discourse, the participants normally strive to maintain a context in which their utterances can be understood without great difficulty. Statements made out of this context do not make sense. The collaborative system of the present invention establishes a similar context for collaborative discourse between a user and a computer agent.

The basic algorithm used in the discourse interpretation module 310 was developed by K. E. Lochbaum from empirical data on human collaborative discourse, and is described in her Ph.D. thesis, "Using Collaborative Plans to Model the Intentional Structure of Discourse", Division of Applied Sciences, Harvard University (1994), incorporated herein by reference. To understand the effects of the discourse interpretation algorithm, the structure of the discourse state 350 is first described in more detail.

The discourse state representation 350 consists of one or more recipe trees 356, a focus stack 354 (shown growing downward), and a history list 352. The history list 352 and focus stack 354 together comprise the segmented interaction history 370. Each of the elements of the discourse state are stored as structured data in the memory 101.

Figure 6:
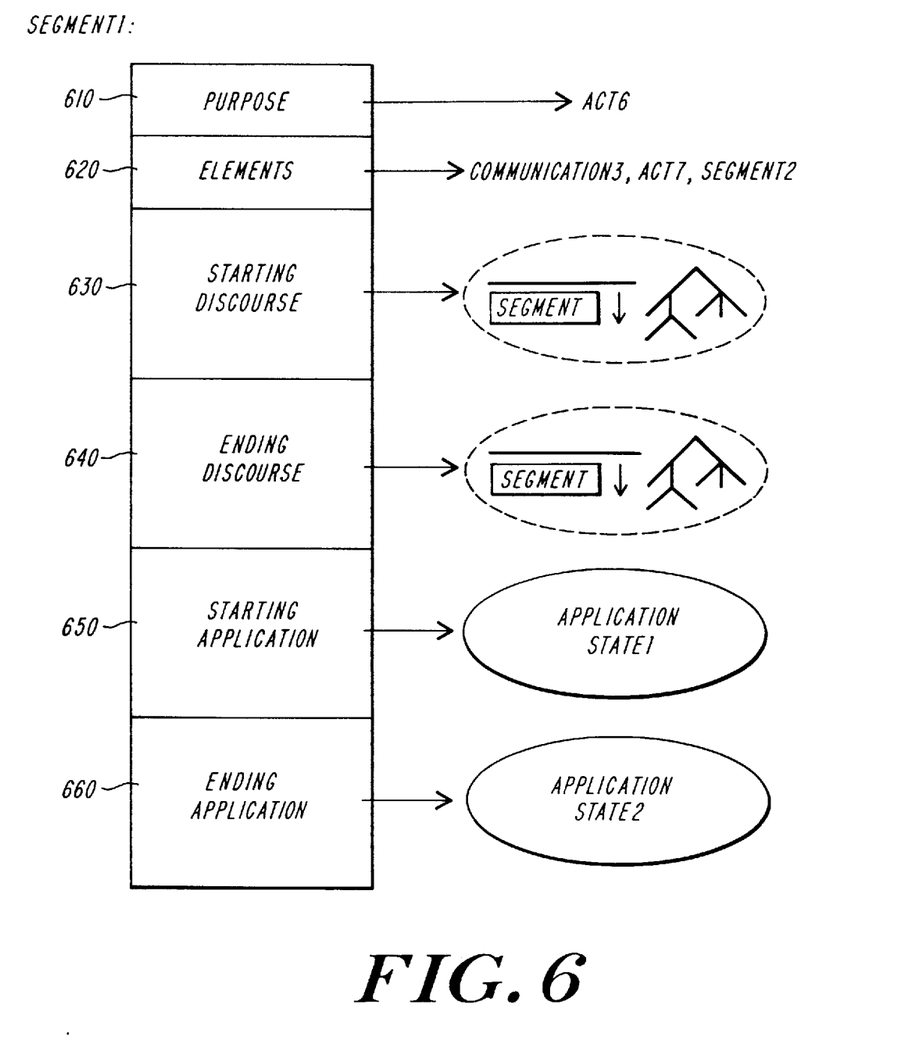
FIG. 6 illustrates a segment structure.

FIG. 6 illustrates the structure of a segment, which is one of the basic building blocks of the discourse state representation. A segment structure has six fields. The first field 610 points to the description of the purpose of the segment, represented in the artificial discourse language described below. The purpose of a segment is typically an abstract action, i.e., one that will be achieved by some combination of more primitive actions and or communications. The second field 620 points to the list of elements of the segment. The elements of a segment may include primitive actions, communications, or other segments (forming a tree of segments). The remaining four fields 630, 640, 650, 660 are described below in the discussion of history-based transformations.

A recipe tree 356 is a concrete representation of some of the mutual beliefs in a SharedPlan (the theoretical construct that accounts for successful collaboration). In general, the root of the recipe tree is the purpose of the base segment of the focus stack 354 (discussed below), and each successive segment on the focus stack corresponds to a subtree of the recipe tree, recursively. The exception is when there is an interruption, i.e., a segment which does not contribute to its parent, in which case we have a disconnected recipe tree for that segment. Recipe trees remain associated with segments even after they are popped off the focus stack.

Figure 4:
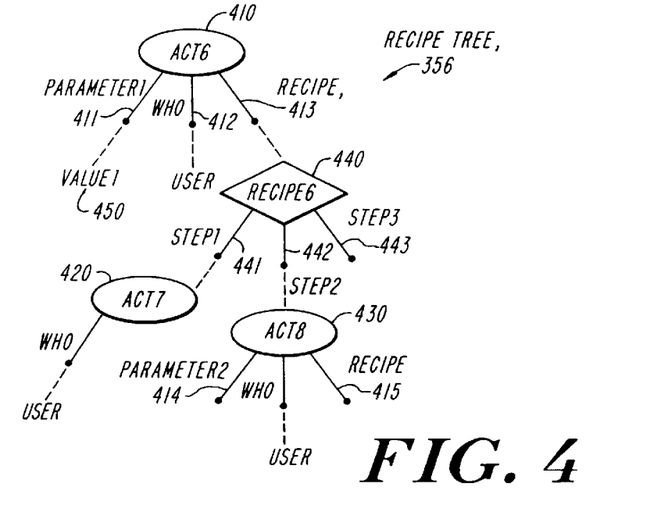
FIG. 4 illustrates a recipe tree structure.

A portion of a recipe tree 356 is illustrated in FIG. 4A recipe tree 356 is composed of alternating act nodes 410, 420, 430 and recipe nodes 440. Both acts and recipes have bindings 411–415, 441–443 with constraints between them specified in their recipe library definitions. An act node, such as act6 410, has a binding for each of its parameters 411, who performs the action 412, and, if it is non-primitive, a recipe node 413. A recipe node 440 has a binding for each act or step 441–443 in the recipe.

To support the nonmonotonic changes in discourse state required for history-based transformations (described below), bindings in recipe trees are implemented using a truth-maintenance system. For example, in FIG. 4, act6's sole parameter 411 has been bound to value1 450 and act6's recipe 413 has been bound to recipe6 440. If a history-based transformation "undoes" act7 420 and act8 430, then act6's recipe binding 413 will be retracted. Similarly, act6's parameter binding 411 will be retracted if the first communication act in its segment is undone (see discussion of FIG. 5 below).

Figure 5:
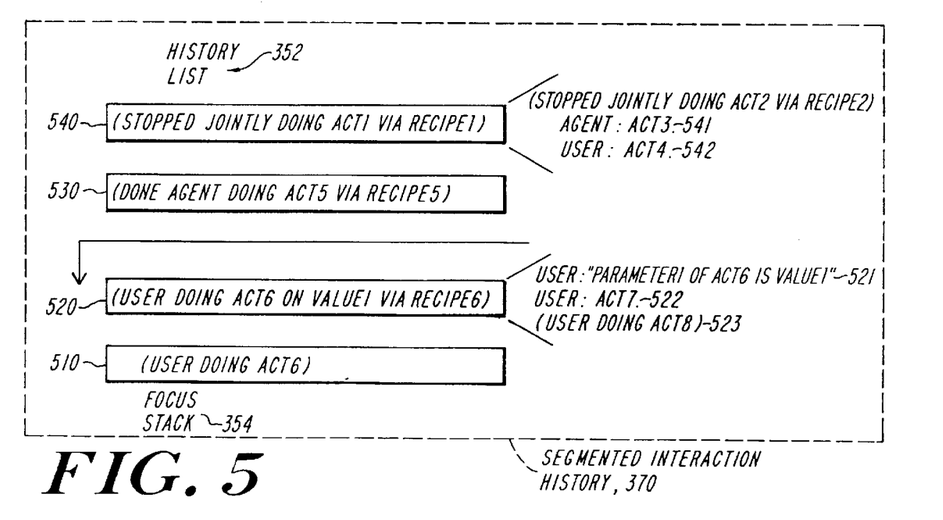
FIG. 5 illustrates a segmented interaction history structure.

A history list 352 and focus stack 354 (shown growing downward), together comprising a segmented interaction history 370, are illustrated in FIG. 5. Both the focus stack and history list contain segments 510, 520, 530, 540. A segment is a contiguous sequence of discourse events (actions on the GUI 103 or communications) which serve some purpose, i.e., which work toward achieving some higher-level action, such as act6 410. For example, a question and answer sequence constitutes a discourse segment whose purpose is (usually) to achieve shared knowledge of some fact. Segments are often hierarchically embedded. For example, a question/answer segment may include a question clarification subsegment. The use of the segmented interaction history 370 in connection with history-based transformations will be discussed below.

The recipe tree and segmented interaction history representations are connected through discourse segment purposes: each discourse segment is associated with the recipe tree for its purpose. In the natural flow of a collaboration, new segments and subsegments are created, pushed onto the focus stack 354, completed, and then popped off the stack. Sometimes, participants also interrupt each other, abandon the current segment (purpose) even though it is not complete, or return to earlier segments. When a segment is popped off the stack, it is added to the history list 352 if and only if it has no parent segment.

Segments 510 and 520 on the focus stack 354 are called open, because they may still have events added to them. Segments 530 and 540, which have been popped off the focus stack and added to the history list 352 are called closed, because they may not be changed. All the segments in the history list, and their subsegments, if any, are closed. Segments on the focus stack may have closed subsegments.

In FIG. 5 and in the display 370 of the segmented interaction history for the user ( see Table 4 below), each segment is described by an English gloss of the internal representation of its purpose. Open segments are glossed with a present participle, such as "doing;" closed segments are glossed starting with "done" or "stopped." As illustrated in FIG. 5, the structure for a segment contains a list of all the discourse events 541, 542, 521, 522 and subsegments 523 which comprise it.

To illustrate the connection between a recipe tree 356 (see FIG. 4) and the focus stack 354 (see FIG. 5), notice that executing act6 410 requires first having a binding for its parameter 411 and recipe 413. The purpose of the base segment 520 of the focus stack 354 is act6. Looking at the discourse events comprising segment 520, we see that parameter1 has been identified in a user communication 521 to be value1, that the user has performed act7 522, and that the user now has the intention of performing act8 523. Act7 420 and act8 430 are the first two steps of recipe6 440. Act8 is also the purpose of the current (top) segment 510 of the focus stack. When act8 is completed (or stopped), its segment 510 will be popped off the focus stack. However, since this segment 510 is a subsegment of segment 520 for act6, it is not added to the history list 352; however, it remains as one of the elements 523 of act6's segment 520. When act6 is complete, its segment 420 will be popped off the focus stack and added to the history list, since it is a "top level" segment.

Returning now to discourse interpretation 310, the basic algorithm can be described as determining whether the current discourse event 14, 15, 210 or 221, contributes to the current discourse purpose, i.e., the purpose of the top segment on the focus stack 354. This breaks down into five main cases. The current act either: (i) directly achieves the current purpose, (ii) is one of the steps in a recipe for the current purpose (this may involve retrieval from the recipe library 340), (iii) identifies the recipe to be used to achieve the current purpose, (iv) identifies who should perform the current purpose or a step in the current recipe, or (v) identifies an unspecified parameter of the current purpose or a step in the current recipe. If one of these cases applies, the current event is added to the recipe tree and the current segment. Furthermore, if this event completes the achievement of the current discourse segment purpose, the focus stack is popped to remove the completed segment.

Certain forms of communications always push a new segment onto the focus stack 354. This new segment may also spawn a new recipe tree 356, depending on whether or not its purpose contributes to the purpose of the current segment.

The result of discourse interpretation 310 is to update the discourse state representation 350 as described above. Whenever the discourse state representation changes, the discourse generation module 320 is invoked to correspondingly update the discourse agenda 330. The discourse generation algorithm operates like the discourse interpretation algorithm in reverse. The agenda 330 is a prioritized list of expected discourse events, i.e., actions and communications which would be understood by the discourse interpretation module 310 in the current discourse state 350. For example, the agenda generated from the discourse state illustrated in FIG. 4 and FIG. 5 would include communications to identify the unknown parameter 414 and recipe 415 of act8 430.

Priorities are assigned to items in the agenda based on simple heuristics. For example, the highest priority is assigned to performing steps of a recipe, all of whose parameters have been bound and all of whose predecessors in the recipe have been executed.

The discourse agenda 330 serves two purposes in the present invention. First, as mentioned above, it is available as an input 383 to the agent 2. A reasonably good default behavior for an agent 2 is simply to perform the highest priority item in the agenda which is specified as executable by the agent 2. Second, the agenda 330 is used to produce the user communication menu 220, as described below.

In order to maintain the coherence of the collaborative discourse, the user 1 in the present invention is not allowed to produce arbitrary communications, but only to select from the user communication menu 220. Unlike conventional ad hoc menu-driven interaction, however, the user communication menu 220 is systematically generated from an underlying theory of orderly discourse. Specifically, the choices in the user communication menu 220 are simply the subset 335 of items in the discourse agenda 330 which are communications that may be made by the user.

Notice that the communication acts 335 extracted from the agenda 330 are glossed 392 into natural language for presentation to the user in the user communication menu 220 and also sent directly in internal form to the user selection module 221. Thus when the user makes a selection 221 from the communication menu 220, the corresponding communication in internal form is sent to the discourse interpretation module 310. No natural language understanding is required on the part of the discourse manager 20 or agent 2. In effect, expectations generated by the discourse context are being used here to obviate the need for natural language understanding.

Alternatively, if one did wish to allow the user to employ unrestricted natural language (including speech), appropriate natural language processing modules would need to be added in place of the user communication menu 220 and user selection module 221, so that the meaning of the user's utterance could be extracted in the internal form required by the discourse manager.

To simplify the internal processing of the collaborative system of the present invention, an artificial discourse language is used to represent communications and actions. The artificial discourse language is described fully in C. L. Sidner, "An Artificial Discourse Language for Collaborative Negotiation," *Proc. 12th National Conf. on Artificial Intelligence*, Seattle, Wash., (1994) pages 814–819, incorporated herein by reference.

Sidner defines a collection of constructors for basic communication types, such as proposing, retracting, accepting, and rejecting proposals. The current implementation of the discourse manager only uses two of these communication types, PFA (propose for accept) and AP (accept proposal), but could be directly extended to use Sidner's other communication types for additional functionality and generality.

The semantics of PFA(t, participant1, belief, participant2) are roughly: at time t, participant1 believes belief, communicates his belief to participant2, and intends for participant2 to believe it also. If participant2 responds with an AP act, e.g., "Ok", then belief is mutually believed.

Sidner's language at this level is very general—the proposed belief may be anything. For communicating about collaborative activities, two application-independent operators for forming beliefs about actions are used in the present invention: SHOULD(act) and RECIPE(act,recipe). Communications of the form PFA( . . . SHOULD(act) . . . ) always start a new segment with the act as its purpose. Additional elements in the artificial language are application-specific (see examples in Table 1).

Whenever representations in the internal discourse language are to be viewed by the user, they are first glossed 390–392 into a natural language textual form by a straightforward recursive substitution process using string templates associated with each operator in the artificial language. The examples in Table 1 illustrate this glossing process 390–392 for an embodiment of the present invention related to an air travel scheduling task. Unbound variables, e.g., parameters of actions that will be bound by further communication or action, are indicated by asterisks. A present participle template is used when the participant performing an act is unspecified. Questions arise out of the embedding of PFA acts.

TABLE 1

---

PFA(36, agent,SHOULD(add-airline(*t,agent,united)),user))
→36 AGENT: "Propose I add United specification."
PFA(l,user,SHOULD(schedule(*t,*who,*route)),agent)
→1 USER: "Propose scheduling a trip."
PFA (11, agent,SHOULD (PFA(*t1, user, RECIPE (schedule (*t2, *who, route(bos,dfw,den,sfo,bos)), *recipe), agent)), user)
→11 AGENT: "How will a trip on Boston to Dallas to Denver to San Francisco to Boston be scheduled?"

---

The segmented interaction history 370, which arises out of the operation of the discourse interpretation module 310, is an extremely useful representation. The segmented interaction history is like a chronological log file, except that it is hierarchically structured and includes not only the primitive events of the system, i.e., the actions and communications of the user and agent, but also the user's and agent's goals for each segment of the history.

The most basic function of the segmented interaction history 370 is to orient the user as to where he is in the collaborative problem solving process. The user can request a glossed 391 textual display 375 of the segmented interaction history (see example in Table 3) at any time, simply by pressing the appropriate button on the GUI 103 or selecting "What have we been doing" in the user communication menu 220. For example, if the user needed to leave the computer in the middle of working on a problem and returned after a few hours (or days), the segmented history would help the user remember what he was doing.

The segmented interaction history 370 also permits powerful and useful transformations on the state of the problem solving process, such as returning to earlier points in the collaboration or replaying earlier segments in a new context. Many different types of transformations are possible based on the structure of the segmented interaction history 370. The framework in which to understand these different types of transformations is in terms of their different effects on the application state and the discourse state. Several specific transformations, such as stop, retry, continue, undo, and replay, are described below by way of example.

The basic unit to which history-based transformations are applied is the segment. Requests to apply transformations applicable to the current segment (the top of the focus stack 354) always appear at the end of the user's communication menu 220. To apply transformations to other segments, the user requests display 375 of the segmented interaction history and then selects the appropriate segment in the history display. Applicable transformation requests for the selected segment are then automatically added to the communication menu 220 . The display of the segmented interaction history 375 serves the function here of identifying the target of a history-based transformation.

The simplest history-based transformation, called "stop," pops an open segment (and all of its subsegments, if any) off the focus stack without changing the application state.

Furthermore, if the purpose of the popped segment contributes to its parent, the appropriate unbindings are also performed in the recipe tree. The stop transformation is applicable only to open segments. The user may employ this transformation to let the agent know that, even though the current goal has not been achieved, the user is no longer working towards it. It may also be useful when the agent has misunderstood what the current goal is. Stopping is a component of some of the other transformations described below. Most other transformations modify both the discourse state and the application state.

In order to support more powerful transformations, which return to earlier points in the history, the discourse manager 20 stores in the memory 101 a copy of the focus stack 354, recipe tree 356, and the application state at the start and end of every segment. (Because the elements of a segment are both primitive events and subsegments, the start of a segment does not always correspond to the end of another segment.) This "snapshot" information is stored in the assigned fields 630, 640, 650, 660 of the segment structure shown in FIG. 6.

The discourse manager 20 assumes that the application provides some method for representing and reestablishing earlier application states. The details of the stored application state representation depend, of course, on the application and include tradeoffs between copying the entire state of an application versus keeping enough information to reconstruct intermediate states by undoing or replaying actions. (If copying the entire state of the application is expensive, segment boundaries suggest good places at which to do so.) Alternatively, the agent can use the segmented history to execute on the CPU 100 the appropriate acts in connection with the application 3 to reestablish a given application state.

Returns are a category of transformation in which both the application and discourse states are reset to an earlier point in the problem solving process. There are three forms of return: retry, continue, and undo. In all three forms, the application state is reset to the state at the start (retry and undo) or end (continue) of the target segment.

Intuitively, retry is the transformation used to return to working on an earlier goal—achieved or not—to try achieving it a different way. Retry is applicable to any segment. Continue is the transformation used to pick up working on an earlier goal, especially one that was stopped. Continue is applicable only to closed segments, since all open segments are currently being continued. In a continue transformation, the recipe is preserved, whereas in a retry the recipe becomes unbound. In general, resetting the discourse state for a retry or continue involves an appropriate stop transformation followed by resetting the stack and recipe tree to their states at either the start (retry) or end (continue) of the target segment. If the segment being returned to is, or its parent is, on the history list, then the appropriate segment to stop is the segment at the base of the stack, thereby emptying the stack. otherwise, the appropriate segment to stop is the open sibling segment of the segment being returned to, if any.

Undo is a familiar transformation used to pretend that work on a goal was never started. Undo is applicable only to open segments, or if the stack is empty, the most recent segment in the history list or any of its terminating subsegments. Resetting the discourse state to undo an open segment involves the same steps as stopping that segment. The only difference is that with undo the application state is also reset. Undoing the last (or terminating) segment on the history list (when the stack is empty) requires only unbinding that segment's purpose from its parent in the recipe tree.

Replay is a transformation which reuses earlier work in a slightly different, i.e., the current, context. The basic idea is that all of the actions in the selected segment are put together into one (possibly hierarchical) "recipe," which is then executed by the agent in the current context. When executing such a replay recipe, it is important for the agent to be prepared for the possibility that some of the acts may not be valid in the current context. Depending on the specific details of the agent's interface to the application, such errors may need to be handled by application-specific code in the agent, or may be taken care of by the application's existing API or graphical interface.

The present invention has been implemented using an example application for scheduling air travel, where the agent assists the user in finding a satisfactory itinerary. A scenario from this example application is described below. The design of a graphical display which supports sharing the application window between the user and the agent is described in Pat. application Ser. No. 08/414,282.

In this scenario, suppose the first thing the user decides to do is to communicate with the agent to initiate a collaboration. (Alternatively, the user could have simply started to operate the application in the ordinary manner, as he can do at any point.) Initially, the user communication menu appears as in Table 2.

TABLE 2

Propose scheduling a trip.
What have we been doing?

As mentioned above, the "What have we been doing?" entry is used to request display of the segmented interaction history for orientation or transformation purposes. The other selection, "Propose scheduling a trip," starts a collaboration. There is only one possible collaboration to propose here, since this example system was built with only one top level goal in mind. A typical, real application would have a range of high-level goals with corresponding user selections for each one. The recipe library for the current example system contains approximately 15 action types and 8 recipes. It is probably about half the size it needs to be to reasonably cover this application domain.

The agent indicates acceptance of the user's proposal by displaying "Ok" in an appropriate window or message area. At this point the agent has only the generic knowledge in the recipe library 340 about typical tasks involved in scheduling a trip and recipes for performing them. It does not know anything about the user's particular trip or preferences. Next, the user operates the application to select three cities in order. The discourse interpretation module 310 recognizes that these three actions form a segment whose purpose is to identify one of the parameters of the current goal, i.e., the route of the trip. If the user requests a display of the segmented interaction history at this point, Table 3 would be displayed.

TABLE 3

(Jointly scheduling a trip on the route)
USER: "Propose scheduling a trip."
AGENT: "Ok."
(User identifying route of scheduling a trip as San Francisco to Dallas to Boston)
USER: Add San Francisco to the route.

TABLE 3-continued

| USER: | Add Dallas to the route, allowing 97 itineraries. |
| USER: | Add Boston to the route, allowing 100+ itineraries. |

The interaction history in Table 3 is hierarchically structured. The purpose of each segment is shown in parentheses at the start of the segment. The elements of a segment are either primitive events (communications or actions) or subsegments. Communications are indicated by quotation marks. In general, the purpose of a subsegment contributes to the purpose of the parent segment.

The user presses an "Ok" button in an appropriate window to signal the end of the current segment. If the user does not do anything else for a specified time, the agent now takes the initiative and asks "How should a trip on the route be scheduled?" This question is an example of intelligent assistance in which the agent helps the user focus on what needs to be decided next in order to move the task forward. The user is free either to answer the agent's question or to ignore it and proceed with operating the application to schedule the trip. If the user wants to answer the question, the communication menu at this point will contain an appropriate choice of inputs, such as "Propose scheduling a trip on the route via__(working forward/backward)." If the user chooses the working forward recipe, the agent then suggests: "Propose you work on San Francisco to Dallas leg." Here again the agent uses the current context to assist the user, in this case to suggest the next step in the current recipe. The user then manipulates the application to specify latest arrival and earliest departure times at each city.

TABLE 4

(Jointly scheduling a trip on the route via working forward)
(Done user identifying route of scheduling a trip as
San Francisco to Dallas to Boston, allowing 100+
itineraries)
(Done user proposing a trip on the route be scheduled
via working forward)
(Done user working on San Francisco to Dallas leg,
allowing 70 itineraries)
(Done user working on Dallas to Boston leg, allowing 55
itineraries)
(Done jointly specifying airlines, allowing 10 itineraries)
USER: Add American specification, allowing no itineraries.
(Done agent adding United specification)
AGENT: "Propose I add United specification."
USER: "Ok."
AGENT: Add United specification, allowing 10 itineraries.
(Done user displaying itineraries)

The display of a segmented interaction history for a completed sample session is shown in Table 4. This example illustrates the varying level of detail which is possible in such a display: the segment in which the agent and user jointly specify airlines is shown in full, while the elements of the other segments are suppressed—only their purposes are displayed. The user can interactively control the level of detail in the display of segmented histories by selecting segments similarly to the way hierarchical file structures are typically inspected.

The airline specification segment is expanded in full in Table 4 to show an example of the agent performing an action, rather than just communicating with the user. The user began this segment by requiring all flights use American airlines, which resulted in no possible itineraries. Whenever a constraint (such as an airline specification) is entered or changed, the application program automatically recomputes the number of possible itineraries and displays this number. In the display of the segmented interaction history, the number of possible itineraries after each segment or action is indicated if it is different from the number before. Noticing that the user had over-constrained the trip, the agent proposed adding United Airlines which, with the user's approval, it did. The agent did not propose this particular airline at random—it used its ability to query 360 the application's API to find an airline that would in fact increase the number of possible itineraries. This feature, however, is part of the design of the agent, and not a part of the discourse manager.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A computer-based manager for collaborative discourse between a user and a computer agent, the manager comprising:

storage means for storing a discourse state;

receiving means for receiving a discourse event;

update means for determining an updated discourse state based upon the stored discourse state and the received discourse event and for storing the updated discourse state in the storage means;

output means for providing the updated discourse state to the computer agent;

generation means for determining a set of expected discourse events; and, means for outputting the set of expected discourse events to the computer agent.

2. The collaborative discourse manager of claim 1, wherein the receiving means includes at least one of:

means for receiving a communication from the user to the computer agent;

means for receiving a communication from the computer agent to the user;

means for determining an operation on the application by the user; and means for determining an operation on the application by the computer agent.

3. The collaborative discourse manager of claim 1, wherein the update means includes:

a recipe library memory storing a plurality of recipes for achieving a respective plurality of objectives using the application;

interpretation means coupled to the recipe library memory for determining a meaning of the received discourse event based upon the discourse state and a recipe in the recipe library memory.

4. A computer-based manager for collaborative discourse between a user and a computer agent, the manager comprising:

storage means for storing a discourse state;

receiving means for receiving a discourse event;

update means for determining an updated discourse state based upon the store discourse state and the received discourse event and for storing the updated discourses state in the storage means said update means including a recipe library memory storing a plurality of recipes for achieving a respective plurality of objectives using the application and interpretation means coupled to the recipe library memory for determining a meaning of the received discourse event based upon the discourse state and a recipe library memory;

output means for providing the updated discourse state to the computer agent, generation means for determining a set of expected discourse events; and wherein the interpretation means includes;

comparison means for comparing the received discourse event with the set of expected discourse events to determine an expected discourse event which is a closest match; and means for outputting a meaning associated with the expected discourse event which is a closest match as the meaning of the received discourse event.

5. The collaborative discourse manager of claim 4, further comprising:

communication means for providing the user with a portion of the set of expected discourse events which correspond to expected communications from the user to the computer agent; and wherein the receiving means includes means for receiving a selection by the user of a discourse event from the portion of the set of expected discourse events.

6. A computer-based manager for collaborative discourse between a user and a computer agent, the manger comprising:

storage means for storing a discourse state;

receiving means for receiving a discourse event;

update means for determining an updated discourse state based upon the stored discourse state and the received discourse event and for storing the updated discourse state in the storage means;

output means for providing the updated discourse state to the computer agent;

generation means for determining a set of expected discourse events;

communication means for providing the user with a portion of the set of expected discourse events which correspond to communications from the user to the computer agent; and wherein the receiving means includes means for receiving a selection by the user of a discourse event from the portion of the set of expected discourse events.

7. A computer-based manager for collaborative discourse between a user and a computer agent, the manager comprising:

storage means for storing a discourse state;

receiving means for receiving a discourse event;

update means for determining an updated discourse state based upon the stored discourse state and the received discourse event and for storing the updated discourse state in the storage means;

output means for providing the updated discourse state to the computer agent.

purpose determining means for determining a purpose for each discourse event in a sequence of discourse events;

organizing means for hierarchically organizing the sequence of discourse events based upon the respective purposes; and history means for storing the hierarchically organized sequence of discourse events and the respective purposes.

8. The collaborative discourse manager of claim 7, further comprising means for outputting the hierarchically organized sequence of discourse events and the respective purposes to the computer agent.

9. The collaborative discourse manager of claim 7, further comprising means for outputting the hierarchically organized sequence of discourse events and the respective purposes to the user.

10. The collaborative discourse manager of claim 7, wherein the history means stores the hierarchically organized sequence of discourse events and the respective purposes in the storage means as part of the discourse state.

11. The collaborative discourse manager of claim 7, further comprising:

purpose selection means for selecting a purpose from the respective purposes corresponding to the sequence of discourse events;

discourse event selection means for selecting a discourse event from the sequence of discourse events corresponding to the selected purpose;

discourse state determining means for determining a prior discourse state corresponding to the selected discourse event; and storing means for storing the prior discourse state in the storage means as the discourse state.

12. A computer-based manager for collaborative discourse between a user and a computer agent both operating a shared application, the manager comprising:

storage means for storing a discourse state;

receiving means for receiving a discourse event;

update means for determining an updated discourse state based upon the stored discourse state and the received discourse event and for storing the updated discourse state in the storage means;

output means for providing the updated discourse state to the computer agent, the receiving means including:

means for receiving a communication from the user to the computer agent;

means for receiving a communication from the computer agent to the user;

means for determining an operation on the application by the user; and, means for determining an operation on the application by the computer agent.

* * * * *